United States Patent
Nakanishi et al.

(10) Patent No.: US 9,837,658 B2
(45) Date of Patent: Dec. 5, 2017

(54) SILICON-CONTAINING PARTICLE, NEGATIVE-ELECTRODE MATERIAL FOR USE IN NON-AQUEOUS ELECTROLYTE SECONDARY BATTERY, AND NON-AQUEOUS ELECTROLYTE SECONDARY BATTERY

(71) Applicant: SHIN-ETSU CHEMICAL CO., LTD., Tokyo (JP)

(72) Inventors: Tetsuo Nakanishi, Annaka (JP); Kazuyuki Taniguchi, Annaka (JP); Yoshiyasu Yamada, Tomioka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/642,901

(22) Filed: Jul. 6, 2017

(65) Prior Publication Data

US 2017/0301913 A1    Oct. 19, 2017

Related U.S. Application Data

(62) Division of application No. 14/769,146, filed as application No. PCT/JP2014/000016 on Jan. 7, 2014.

(30) Foreign Application Priority Data

Mar. 5, 2013   (JP) ................................ 2013-042840

(51) Int. Cl.

| | | |
|---|---|---|
| *H01M 6/14* | (2006.01) | |
| *H01M 4/134* | (2010.01) | |
| *H01M 4/38* | (2006.01) | |
| *H01M 10/0525* | (2010.01) | |
| *H01M 4/46* | (2006.01) | |
| *H01M 4/42* | (2006.01) | |
| *H01M 10/052* | (2010.01) | |
| *H01M 4/62* | (2006.01) | |
| *C22C 19/03* | (2006.01) | |
| *H01M 4/02* | (2006.01) | |
| *C22C 9/00* | (2006.01) | |

(52) U.S. Cl.
CPC ............ *H01M 4/134* (2013.01); *H01M 4/38* (2013.01); *H01M 4/386* (2013.01); *H01M 4/387* (2013.01); *H01M 4/42* (2013.01); *H01M 4/463* (2013.01); *H01M 10/052* (2013.01); *H01M 10/0525* (2013.01); *C22C 9/00* (2013.01); *C22C 19/03* (2013.01); *H01M 4/625* (2013.01); *H01M 2004/021* (2013.01); *H01M 2004/027* (2013.01)

(58) Field of Classification Search
CPC ....... H01M 10/0525; H01M 2004/027; H01M 4/134; H01M 4/38; H01M 4/386; H01M 4/387; H01M 4/42; H01M 4/463; H01M 4/625; Y02E 60/122
See application file for complete search history.

(56) References Cited

U.S. PATENT DOCUMENTS

| | | |
|---|---|---|
| 5,556,721 A | 9/1996 | Sasaki et al. |
| 6,413,672 B1 | 7/2002 | Suzuki et al. |
| 6,685,804 B1 | 2/2004 | Ikeda et al. |
| 6,887,511 B1 | 5/2005 | Shima et al. |
| 2005/0208379 A1* | 9/2005 | Musha ................. H01M 4/134 429/231.95 |
| 2006/0275662 A1 | 12/2006 | Hirose et al. |
| 2010/0266902 A1 | 10/2010 | Takano et al. |
| 2011/0244333 A1 | 10/2011 | Kawada |
| 2011/0287317 A1* | 11/2011 | Nakanishi ............ H01M 4/134 429/218.1 |

FOREIGN PATENT DOCUMENTS

| | | |
|---|---|---|
| CN | 101919090 A | 12/2010 |
| CN | 102263242 A | 11/2011 |
| EP | 2 104 175 A2 | 9/2009 |
| EP | 2 590 248 A2 | 5/2013 |
| JP | 2964732 B2 | 10/1999 |
| JP | 2000-173596 A | 6/2000 |
| JP | 3079343 B2 | 8/2000 |
| JP | 3291260 B2 | 6/2002 |
| JP | 2003-109590 A | 4/2003 |

(Continued)

OTHER PUBLICATIONS

Mar. 25, 2014 International Search Report issued in Patent Application No. PCT/JP2014/000016.
Sep. 8, 2015 International Preliminary Report on Patentability issued in International Patent Application No. PCT/JP2014/000016.
Jan. 26, 2016 Office Action issued in Japanese Patent Application No. 2013-042840.
Sep. 12, 2016 Office Action Issued in U.S. Appl. No. 14/769,146.
Aug. 25, 2016 Search Report issued in European Patent Application No. 14760542.2.

(Continued)

*Primary Examiner* — Patrick Ryan
*Assistant Examiner* — Ben Lewis
(74) *Attorney, Agent, or Firm* — Oliff PLC

(57) ABSTRACT

The present invention is directed to a silicon-containing particle for use as a negative-electrode active material of a non-aqueous electrolyte secondary battery, wherein a crystal grain size is 300 nm or less, the crystal grain size being obtained by a Scherrer method from a full width at half maximum of a diffraction line attributable to Si (111) and near $2\theta=28.4°$ in an x-ray diffraction pattern analysis, and a true density is more than 2.320 g/cm$^3$ and less than 3.500 g/cm$^3$. The invention provides silicon-containing particles for use as a negative-electrode active material of a non-aqueous electrolyte secondary battery that enable manufacture of a non-aqueous electrolyte secondary battery having an excellent cycle characteristics and a higher capacity compared with graphite types.

20 Claims, No Drawings

(56) References Cited

FOREIGN PATENT DOCUMENTS

| JP | 2004/185991 A | 7/2004 |
|---|---|---|
| JP | 2004-303593 A | 10/2004 |
| JP | 3702223 B2 | 10/2005 |
| JP | 3702224 B2 | 10/2005 |
| JP | 2005/317309 A | 11/2005 |
| JP | 2006-338996 A | 12/2006 |
| JP | 4183488 B2 | 11/2008 |
| JP | 2011-222151 A | 11/2011 |
| JP | 2012-009421 A | 1/2012 |
| JP | 2012-178344 A | 9/2012 |

OTHER PUBLICATIONS

Wald, F. et al. "The Ternary System Cobalt-Germanium-Silicon". Journal of the Less-Common Metals, vol. 24, 277-289, 1971.
Nov. 3, 2016 Office Action issued in Chinese Application No. 201480012160.6.

* cited by examiner

SILICON-CONTAINING PARTICLE, NEGATIVE-ELECTRODE MATERIAL FOR USE IN NON-AQUEOUS ELECTROLYTE SECONDARY BATTERY, AND NON-AQUEOUS ELECTROLYTE SECONDARY BATTERY

This is a Divisional of application Ser. No. 14/769,146 filed Aug. 20, 2015, which in turn is the U.S. national phase of international application No. PCT/JP2014/000016 filed Jan. 7, 2014. The entire disclosures of the prior applications are hereby incorporated by reference herein their entirety.

BACKGROUND OF THE INVENTION

Field of the Invention

The present invention relates to a silicon-containing particle, a negative-electrode material for use in a non-aqueous electrolyte secondary battery using the same, and a non-aqueous electrolyte secondary battery.

Description of the Related Art

As mobile devices such as mobile electronic devices and mobile communication devices have highly developed, non-aqueous electrolyte secondary batteries with higher energy density are recently needed to improve efficiency and reduce the size and weight of the devices. The development of hybrid vehicles and electric vehicles, on the other hand, has been increasing so that fuel consumption is improved and discharge of global warming gasses is inhibited in use of these vehicles.

Silicon is the most promising material to reduce a battery size and increase a battery capacity since it exhibits a theoretical capacity of 4,200 mAh/g, which is much higher than a theoretical capacity of 372 mAh/g of carbonaceous materials that are currently used in commercial batteries.

Patent document 1, for example, discloses a lithium-ion secondary battery using a silicon single crystal as a support for a negative-electrode active material.

Patent document 2 discloses a lithium-ion secondary battery using a lithium alloy comprising $Li_xSi$ (where x is a value of 0 to 5) of single crystal silicon, polycrystalline silicon, or amorphous silicon. In this document, $Li_xSi$ of amorphous silicon is preferred, and pulverized crystalline silicon coated with amorphous silicon obtained by plasma decomposition of monosilane is exemplified.

Although the example of this document uses a small amount of silicon at the rate of 30 mass % with respect to a negative-electrode material, this does not exhibit cycle stability on several thousands of times unlike graphite types and thus has no practical use.

Patent documents 3 to 5 disclose methods of depositing an amorphous silicon thin film on an electrode current collector by a vapor deposition method to use the film as a negative electrode.

Patent document 6 discloses a method of controlling a growth direction to inhibit a decrease in cycle characteristics due to volume expansion during vapor phase growth of silicon directly on the current collector. This method achieves improvement in cycle characteristics, but limits its production rate of an electrode, thereby increasing cost. In addition, it is difficult to increase the thickness of the silicon thin film, and copper that forms the negative-electrode current collector is diffused into the silicon.

In view of these problems, there has recently been disclosed the following methods: a method for suppressing volume expansion by using silicon-containing particles and restricting the utilization ratio of a silicon battery capacity (See Patent documents 7 to 9); a method for using the grain boundary of a polycrystalline particle as a buffer region to volume variations by rapidly cooling a silicon melt in which alumina is added (See Patent document 10); a method of using polycrystalline particles of mixed phase polycrystals of α- and β-$FeSi_2$ (See Patent document 11); a method of high temperature plastic working of a single crystal silicon ingot (See Patent document 12); and other methods.

As described above, metallic silicon and silicon alloy with various crystal structures have been suggested to use silicon as an active material. None of these exhibits cycle stability on a par with graphite types and has a cost advantage. Yet, no one has suggested a manufacturing method that enables mass synthesis at low cost.

CITATION LIST

Patent Literature

Patent Document 1: Japanese Patent No. 2964732
Patent Document 2: Japanese Patent No. 3079343
Patent Document 3: Japanese Patent No. 3702223
Patent Document 4: Japanese Patent No. 3702224
Patent Document 5: Japanese Patent No. 4183488
Patent Document 6: Japanese Unexamined Patent publication (Kokai) No. 2006-338996
Patent Document 7: Japanese Unexamined Patent publication (Kokai) No. 2000-173596
Patent Document 8: Japanese Patent No. 3291260
Patent Document 9: Japanese Unexamined Patent publication (Kokai) No. 2005-317309
Patent Document 10: Japanese Unexamined Patent publication (Kokai) No. 2003-109590
Patent Document 11: Japanese Unexamined Patent publication (Kokai) No. 2004-185991
Patent Document 12: Japanese Unexamined Patent publication (Kokai) No. 2004-303593

SUMMARY OF THE INVENTION

The present invention was accomplished in view of the above-described problems. It is an object of the present invention to provide silicon-containing particles for use as a negative-electrode active material of a non-aqueous electrolyte secondary battery that enable manufacture of a non-aqueous electrolyte secondary battery having an excellent cycle characteristics and a higher capacity compared with graphite types.

To achieve this object, the present invention provides a silicon-containing particle for use as a negative-electrode active material of a non-aqueous electrolyte secondary battery, wherein a crystal grain size is 300 nm or less, the crystal grain size being obtained by a Scherrer method from a full width at half maximum of a diffraction line attributable to Si (111) and near 2θ=28.4° in an X-ray diffraction pattern analysis, and a true density is more than 2.320 g/cm³ and less than 3.500 g/cm³.

Using silicon-containing particles having the above crystal grain size and true density as a negative-electrode active material of a non-aqueous electrolyte secondary battery allows for its negative electrode having a high electron conductivity, a comparatively small volume expansion, and an excellent cycle characteristics, although the battery capacity per unit weight of the active material is in the range from 900 to 3000 mAh/g, which is lower than the theoretical capacity (4,200 mAh/g) per unit weight of an active material composed of silicon alone. These silicon-containing particles enable good cycle characteristics even when being mixed with a graphite-type negative-electrode material.

The silicon-containing particle preferably has a powder particle size (referred to as a "particle size" below) ranging from 1 μm to 20 μm when this size is expressed by a volume median diameter $D_{50}$ (i.e., a particle size or a median diameter when a cumulative volume is 50%) by a measurement method of particle size distribution based on a laser diffraction scattering.

Increasing the particle size of the silicon-containing particle to 1 μm or more in terms of the volume median diameter $D_{50}$ can lower the risk of reduction in charge/discharge capacities per volume due to a decrease in bulk density.

Decreasing the particle size of the silicon-containing particle to 20 μm or less in terms of the volume median diameter $D_{50}$ can lower the risk of a short circuit due to the silicon-containing particle penetrating a negative-electrode film to the minimum, and significantly reduce the possibility that the negative-electrode material is detached from a current collector contacting a negative electrode without making it difficult to form the electrode. This facilitates the formation of the electrode.

Moreover, a quotient of a volume median diameter $D_{50}$ of a particle size of the silicon-containing particle divided by the crystal grain size preferably ranges from 1 to 5000.

The silicon-containing particle having the above relationship between the volume median diameter $D_{50}$ of its particle size and its crystal grain size can achieve inhibition of volume expansion due to the micronization of the silicon-containing particle.

The silicon-containing particle preferably contains one or more elements selected from the group consisting of boron, aluminum, phosphorus, titanium, vanadium, chromium, manganese, iron, cobalt, nickel, copper, zinc, arsenic, germanium, tin, antimony, indium, tantalum, tungsten, and gallium.

The silicon-containing particle containing one or more elements selected from this group can reduce its volume resistivity and hence enables the formation of a negative electrode of a non-aqueous electrolyte secondary battery that has excellent electron conductivity.

The above silicon-containing particle can be used for a negative-electrode material of a non-aqueous electrolyte secondary battery as the negative-electrode active material of the non-aqueous electrolyte secondary battery.

Using the silicon-containing particle for the negative-electrode material as the negative-electrode active material allows a non-aqueous electrolyte secondary battery having a high capacity and a long lifetime to be provided at low cost.

The negative-electrode material of a non-aqueous electrolyte secondary battery may contain graphite as a conductive agent.

This negative-electrode material of a non-aqueous electrolyte secondary battery containing graphite as a conductive agent can maintain its conductivity.

The non-aqueous electrolyte secondary battery preferably has a negative-electrode molded body made of the above negative-electrode material of the non-aqueous electrolyte secondary battery; a positive-electrode molded body; a separator configured to separate the negative-electrode molded body from the positive-electrode molded body; and a non-aqueous electrolyte.

This non-aqueous electrolyte secondary battery having the negative-electrode molded body made of the above negative-electrode material can achieve a high capacity and a long lifetime.

The non-aqueous electrolyte of the non-aqueous electrolyte secondary battery preferably contains lithium ions.

The negative-electrode molded body made of the above negative-electrode material of the non-aqueous electrolyte secondary battery is used suitably for a lithium ion secondary battery having the non-aqueous electrolyte containing lithium ions.

As described above, use of the silicon-containing particles of the present invention as a negative-electrode active material allows for a non-aqueous electrolyte secondary battery having a high capacity and a long lifetime.

DESCRIPTION OF EMBODIMENTS

The present invention will be described below in more detail.

Although metallic silicon and silicon alloy with various crystal structures have been proposed to use silicon as an active material as described previously, none of these exhibits cycle stability on a par with graphite, and no one has suggested a manufacturing method that enables mass synthesis at low cost.

In view of this, the present inventors have diligently considered silicon active material that has a battery capacity per unit mass excessing a theoretical capacity of 372 mAh/g provided by carbonaceous materials and maintains its cycle stability, and a method of manufacturing this material at low cost. The inventors consequently found the following: when silicon-containing particles exhibiting true density of more than 2.320 g/cm$^3$ and less than 3.500 g/cm$^3$ and a crystal grain size value of 300 nm or less that is obtained by the Scherrer method from the full width at half maximum of a diffraction line attributable to Si (111) and near 2θ=28.4° in an X-ray diffraction pattern analysis are used as a negative-electrode active material for use in a non-aqueous electrolyte secondary battery, this battery has a high battery capacity of 900 to 3000 mAh/g, a high coulombic efficiency, and an excellent cycle stability even when a mixture of this material and graphite material is used. The inventors have thereby brought the invention to completion.

The silicon-containing particle of the present invention has a crystal grain size of 300 nm or less that is obtained by the Scherrer method from the full width at half maximum of a diffraction line attributable to Si (111) and near 2θ=28.4° in an X-ray diffraction pattern analysis.

Such silicon-containing particles inhibit their volume variation upon charging/discharging and hence a stress at their crystal grain boundary when being used as a negative-electrode active material of a secondary battery using a non-aqueous electrolyte, thereby maintaining a high initial efficiency and a high battery capacity that are attributable to silicon.

In addition, even when a mixture of these particles and graphite material, which usually has a low volume expansion coefficient, is used, large independent volume expansion of the silicon particles does not occur. A non-aqueous electrolyte secondary battery that inhibits the separation of the silicon particles from the graphite material and has an excellent cycle characteristics can thereby be obtained.

An example of measurement conditions of crystal X-ray diffraction will be described below.

An X-ray diffraction apparatus that may be used herein is D8 ADVANCE made by Bruker Corp. The X-ray source is a Cu-Kα ray. With an Ni filter, the measurement is taken at the range from 10° to 90° under conditions of an output of 40 kv/40 mA, a slit width of 0.3°, a step width of 0.0164°, and a measurement time of one second per step. The measured data is compared after a smoothing process is performed by removing a Kα2 ray at an intensity ratio of 0.5. When the range from 10° to 60° is fully observed by this measurement, three sharp signals with large intensities can be observed. These signals are a 28.4° diffraction line attributable to Si (111) of a diamond structure, a 47.2° diffraction line attributable to Si (220), and a 56.0° diffraction line attributable to Si (311).

The silicon-containing particle of the present invention is selected according to a crystal grain size calculated by analysis based on the Scherrer method from the full width at half maximum of the 28.4° diffraction line attributable to Si (111). The silicon-containing particle of the present invention preferably has a size of 300 nm or less, and more preferably a size of 200 nm or less.

The silicon-containing particle of the present invention also has the true density of more than 2.320 g/cm$^3$ and less than 3.500 g/cm$^3$. This value is measured by a dry densitometer.

It is to be noted that the measurement conditions of the dry densitometer are, for example, as follows:

An example of the dry densitometer that may be used is accupyc ii 1340 made by SHIMADZU CORPORATION. A purge gas to be used is a helium gas. The measurement is made in a sample holder that maintains a temperature of 23° C. after the purge is repeated 200 times.

The above true density of the silicon-containing particle can also be achieved, for example, by adding elements other than silicon.

From the viewpoint of vapor pressure and effects, particularly desirable examples of the additional elements include one or more elements selected from the group consisting of boron, aluminum, phosphorus, titanium, vanadium, chromium, manganese, iron, cobalt, nickel, copper, zinc, arsenic, germanium, tin, antimony, indium, tantalum, tungsten, and gallium.

These elements are added as necessary, and its amount may be about 50 mass % or less, preferably 0.001 to 30 mass %, more preferably 0.01 to 10 mass %. In this case, 0.01 mass % or more of the additional elements can reliably reduce the volume resistivity; 10 mass % or less of the additional elements makes it difficult to cause the segregation of the additional elements and can reliably prevent an increase in volume expansion.

The silicon-containing particle of the present invention used as a negative-electrode active material of a non-aqueous electrolyte secondary battery preferably has a particle size ranging from 1 μm to 20 μm when this size is expressed by the volume median diameter $D_{50}$ (i.e., a particle size or a median diameter when a cumulative volume is 50%) by a measurement method of particle size distribution based on a laser diffraction scattering.

When $D_{50}$ is 1 μm or more, the risk of reduction in charge/discharge capacities per volume due to a decrease in bulk density can be lowered to the utmost.

When $D_{50}$ is 20 μm or less, the risk of a short circuit due to the particle penetrating a negative-electrode film can be lowered to the minimum, and the possibility of detachment from a current collector can be significantly reduced without making it difficult to form the electrode.

Moreover, the quotient of the volume median diameter $D_{50}$ divided by the crystal grain size preferably ranges from 1 to 5000, more preferably from 3 to 1000, further preferably from 50 to 500, because the silicon-containing particle having a particle size of 20 μm or less, particularly 10 μm or less, further 1 μm or less inhibits its volume expansion due to its micronization.

This type of silicon-containing particle has an amorphous grain boundary and a crystal grain boundary and relieves a stress in the amorphous grain boundary and the crystal grain boundary, thereby refraining from collapsing during charging/discharging cycles. Use of such silicon-containing particles as a negative electrode material of a non-aqueous electrolyte secondary battery thereby allows this negative electrode material to endure the stress due to its volume expansion upon charging/discharging. This non-aqueous electrolyte secondary battery with the negative electrode material using these silicon-containing particles exhibits battery characteristics of a high capacity and a long lifetime.

The following description includes, by way of example, the detail of a method of manufacturing the silicon-containing particles for use as a negative-electrode active material of a non-aqueous electrolyte secondary battery of the present invention, and a negative-electrode material, a negative electrode, and a non-aqueous electrolyte secondary battery that use these obtained particles as the negative-electrode active material of the non-aqueous electrolyte secondary battery. The invention, however, is not limited thereto.

First, silicon can be deposited on a substrate by a vapor deposition method, for example, under reduced pressure. Instead, silicon alloy is preferably deposited by a vapor deposition method using a raw material of silicon and one or more elements selected from the group consisting of boron, aluminum, phosphorus, titanium, vanadium, chromium, manganese, iron, cobalt, nickel, copper, zinc, arsenic, germanium, tin, antimony, indium, tantalum, tungsten, and gallium.

This silicon to be used as the raw material is classified depending on the crystallinity into single crystal silicon, polycrystalline silicon and amorphous silicon, or depending on the purity into chemical grade silicon and metallurgical grade silicon, which are called metallic silicon, and may be selected from these. Among these, an inexpensive material is preferably used.

The method of vapor depositing silicon may be performed by vacuum deposition or sputtering. The vacuum deposition is preferable because it is efficient due to a higher deposition rate. The vacuum deposition is selected, depending on a deposition material or substrate on which silicon is to be deposited, from various methods: a resistance heating method; an electron beam heating method; a dielectric heating method and so on; a laser heating method. The electron beam heating method is advantageous because of a high thermal efficiency.

In particular, a silicon-containing alloy precipitated by vapor phase deposition such as the vacuum deposition enables its crystal grain size to be controlled optionally between an amorphous state and a polycrystalline state regardless of metal species to be added. Therefore, this is a useful method.

Melt extraction is particularly advantageous when metal having a low melting point is used, or when a material composed so as to have a eutectic point of a silicon mixture is used. Preferable experimental conditions are as follows: a raw material is charged into a carbon crucible and melted by high frequency induction heating; this melting is performed in a melting apparatus under an inert gas atmosphere to inhibit the generation of an oxide.

The silicon-containing particles for use as a negative-electrode active material of a non-aqueous electrolyte secondary battery of the present invention can be manufactured with a desired particle grain size by the melt extraction or the vacuum deposition. It is also possible to use the melt extraction or the vacuum deposition properly depending on metal species to be added.

A silicon lump or a silicon alloy lump manufactured in the above manner is pulverized and classified by a conventional method that is described below such that the size of the resultant particles becomes a desired size.

Examples of pulverizer to be used include a ball mill and a media agitating mill, which move grinding media such as balls or beads and pulverize an object by using impact forces, friction forces or compression forces generated by the kinetic energy; a roller mill, which pulverizes an object by using compression forces generated by rollers; a jet mill, which causes an object to collide against an inner wall or against part of the broken object at a high speed and pulverizes the object by impact forces generated by the collision; a hammer mill, pin mill and disc mill, which pulverize an object by using impact forces generated by rotation of a rotor with hammers, blades or pins attached thereto; a colloid mill using shear forces; and a wet, high pressure, counter-impingement dispersing machine "Ultimizer".

Either wet or dry pulverizing may be employed.

The pulverizing is followed by dry, wet or sieve classifying in order to make particle size distribution uniform.

The dry classifying mainly uses a gas stream and is performed by successive or simultaneous processes of dispersion, separation (separation between fine and coarse particles), collection (separation between solid and gas), and discharge. Before the classifying, a pretreatment such as adjustment of water content, dispersiveness, humidity, or other conditions may be performed, or the moisture content or oxygen concentration of the gas stream to be used may be adjusted. Performing either this pretreatment or this adjustment allows the prevention of reduction in classifying efficiency due to interference between particles, particle shape, turbulence of the gas stream, velocity distribution, electrostatic charges, or other causes.

An integrated type of dry pulverizer and classifier can conduct pulverizing and classifying operations at once to achieve desired particle size distribution.

After the silicon-containing particles for use as a negative-electrode active material of a non-aqueous electrolyte secondary battery are pulverized so as to have a prescribed size, each of these particles may be coated with a carbon film to further improve their conductivity; this carbon film is formed by performing an aging process of a heat treatment at temperatures ranging from 200° C. to 1200° C. (preferably 600° C. to 1000° C.) under normal pressure or reduced pressure and under an inert gas atmosphere, and thermal chemical vapor deposition with a hydrocarbon compound gas and/or vapor supplied.

The silicon-containing particles pulverized so as to have a prescribed size may also be coated with a metallic oxide such as aluminum oxide, titanium oxide, zinc oxide, zirconium oxide, or a mixture thereof.

The silicon-containing particles thus produced have a crystal grain size of 300 nm or less that is obtained by the Scherrer method from the full width at half maximum of the diffraction line attributable to Si (111) and near $2\theta=28.4°$ in an X-ray diffraction pattern analysis, and a true density of more than 2.320 g/cm$^3$ and less than 3.500 g/cm$^3$. In addition, these silicon-containing particles exhibit a high battery capacity of 900 to 3000 mAh/g, a high coulombic efficiency, and an excellent cycle characteristics even when being mixed with graphite material.

The mass ratio of the silicon-containing particles in the negative-electrode material of the present invention to the entire negative-electrode material may be 3 to 97 mass %. Moreover, the mass ratio of a binder in the negative-electrode material to the entire negative-electrode material may be 1 to 20 mass %, more preferably 3 to 10 mass %. When the mass ratio of the binder is in this range, the negative electrode can lower the risk of the separation of the negative-electrode active material and the impediment to the movement of Li ions due to reduction in porosity followed by enlargement of an insulator film to the utmost.

In production of a negative-electrode material by using the above silicon-containing particles for use as a negative-electrode active material of a non-aqueous electrolyte secondary battery and the binder, dilution with an active material such as graphite results in improvement in its conductivity and inhibition of volume expansion. In this case, although the battery capacity of this negative-electrode material decreases depending on the degree of the dilution, the capacity can be higher than the capacity of a conventional graphite material. In addition, its cycle characteristics is improved compared with the case of the silicon-containing particles alone.

In this case, the type of the graphite material is not particularly limited. Specific examples of this graphite material that can be used include natural graphite, synthetic graphite, powder of various cokes, meso-phase carbon, vapor phase grown carbon fiber, pitch base carbon fiber, PAN base carbon fiber, and various sintered resin.

If the graphite material is used, then the mass ratio of the added graphite material to the entire negative-electrode material is 2 to 96 mass %. Even when this ratio is 60 to 95 mass %, the battery capacity is higher than the capacity of a conventional graphite material.

When the mass ratio of this conductive agent is in the above range, an increase in initial resistance due to a lack of conductivity of the negative-electrode material can be reliably inhibited.

For example, from the negative-electrode material for use in a non-aqueous electrolyte secondary battery of the present invention, obtained in the above manner, a negative electrode can be produced as follows. The negative-electrode material composed of the above negative-electrode active material, the graphite material, the binder, and other additives are mixed in a solvent, such as water or N-methylpyrrolidone, suitable for dissolution and dispersion of the binder, so that a paste mixture is formed. This mixture is applied to the current collector so as to form a sheet thereof. A material such as copper foil or nickel foil that is commonly used for a negative electrode collector may be used for this current collector without limit of its thickness and a surface treatment. Note that the method for forming the mixture sheet is not particularly limited, but may be a known method.

A negative electrode including this type of negative-electrode material is mainly composed of a negative-electrode active material that is made of the silicon-containing particles for use as a negative-electrode active material of a non-aqueous electrolyte secondary battery of the present invention having a greatly smaller volume variation upon charging and discharging compared with one made of conventional silicon-containing particles. In addition, the variation in thickness of the negative electrode after charging is less than three times (especially 2.5 times) as large as before charging.

A negative electrode molded body using the negative electrode thus obtained can be used to produce a non-aqueous electrolyte secondary battery, and particularly a lithium-ion secondary battery.

Such a non-aqueous electrolyte secondary battery is characterized by using this negative electrode molded body. Other materials such as a positive electrode (a positive electrode molded body), a separator, an electrolytic solution, and a non-aqueous electrolyte and the battery shape are not particularly limited.

Examples of a positive-electrode active material include oxides and sulfides that can occlude and release lithium ions, alone or in combination.

Specific examples include sulfides and oxides of metals containing no lithium such as $TiS_2$, $MoS_2$, $NbS_2$, $ZrS_2$, $VS_2$, $V_2O_5$, $MoO_3$, and $Mg(V_3O_8)_2$, lithium, lithium-containing complex oxides, composite metals such as $NbSe_2$, and olivine iron. Among them, a lithium complex oxide based on $Li_pMetO_2$ is preferably used to increase an energy density. Then, Met is preferably at least one of cobalt, nickel, iron and manganese, and p is normally a value in the range of $0.05 \leq p \leq 1.10$. Specific examples of the lithium complex oxide include $LiCoO_2$, $LiNiO_2$, $LiFeO_2$, and $Li_qNi_rCo_{1-r}O_2$ that have a layered structure (where $0<q<1$ and $0.7<r\leq1$ in general, but q and r vary depending on charged/discharged states of a battery), $LiMn_2O_4$ having a spinel structure, and rhombic $LiMnO_2$. Exemplary positive-electrode active material for high voltage operation is a substitutional spinel manganese compound such as $LiMet_sMn_{1-s}O_4$ ($0<s<1$), where Met is titanium, chromium, iron, cobalt, nickel, copper, zinc or the like.

It is noted that the lithium complex oxide can be prepared, for example, by mixing a pulverized carbonate, nitrate, oxide or hydroxide of lithium with a pulverized carbonate, nitrate, oxide or hydroxide of a transition metal in accordance with the desired composition, and firing the mixture at temperatures ranging from 600° C. to 1,000° C. under an oxygen atmosphere.

Organic materials may also be used as the positive-electrode active material. Examples of these materials include polyacetylene, polypyrrole, polyparaphenylene, polyaniline, polythiophene, polyacene, and polysulfide compound.

The positive-electrode active material is mixed with the same conductive agent and binder as used for the negative-electrode material. This mixture is applied to the current collector. A positive-electrode molded body can be formed by a known method.

The separator disposed between the positive and negative electrodes is not particularly limited, provided it stabilizes against an electrolyte solution and holds the electrolyte solution effectively. Typical examples of the separator include a porous sheet or nonwoven fabric of: polyolefins such as polyethylene and polypropylene; copolymers thereof; and aramid resins. These may be used alone or as a laminate of multiple layers. Ceramics such as metal oxides may be deposited on a surface thereof. Porous glass and ceramics may also be used.

The solvent used for a non-aqueous electrolyte secondary battery in the present invention is not particularly limited, provided it can be used as a non-aqueous electrolyte solution.

Typical examples of the solvent include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methylsulfolane, acetonitrile, propionitrile, anisole, acetic acid esters, e.g., methyl acetate and propionic acid esters. These solvents are preferably used as a mixture of an aprotic high-dielectric-constant solvent and an aprotic low-viscosity solvent in a proper ratio.

It is also acceptable to use ionic liquid containing imidazolium, ammonium and pyridinium cations. A counter anion may be, but not particularly limited to, $BF_4^-$, $PF_6^-$ and $(CF_3SO_2)_2N^-$. The ionic liquid may be used as a mixture with the above non-aqueous electrolyte solvent.

If a solid electrolyte or gel electrolyte is used, then the electrolyte may contain a silicone gel, silicone polyether gel, acrylic gel, silicone acrylic gel, acrylonitrile gel, poly(vinylidene fluoride), or other material, as a polymeric material. The polymerization may be brought before or after liquid insertion. These materials may be used alone or in combination.

Exemplary electrolyte salt include light metal salt.

Examples of the light metal salt include salts of alkali metals such as lithium, sodium and potassium, salts of alkaline earth metals such as magnesium and calcium, and aluminum salts. One or more of these light metal salts may be selected depending on the purpose. Exemplary lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_5F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_9Li$, alone or in combination.

From the viewpoint of electric conductivity, the concentration of the electrolyte salt in the non-aqueous electrolyte solution preferably ranges from 0.5 to 2.0 mol/L. The conductivity of the electrolyte is preferably 0.01 S/cm or more at a temperature of 25° C. This conductivity may be adjusted by the type and concentration of the electrolyte salt.

Moreover, the non-aqueous electrolytic solution may contain various additives as necessary.

Examples of these include: additives to improve cycle life such as vinylene carbonate, methyl vinylene carbonate, ethyl vinylene carbonate and 4-vinylethylene carbonate; additives to prevent overcharge such as biphenyl, alkylbiphenyl, cyclohexylbenzene, t-butylbenzene, diphenyl ether, and benzofuran; additives to remove acid and water such as various carbonate compounds, carboxylic acid anhydrides, nitrogen-containing compounds and sulfur-containing compounds.

The shape of the non-aqueous electrolyte secondary battery is not particularly limited and may be freely selected. Typical batteries has a coin shape in which the electrodes and the separator that are punched out into a coin shape are stacked, or a square or cylindrical shape in which the electrode sheets and the separator are spirally coiled.

EXAMPLES

The present invention will be more specifically described below with reference to examples and comparative examples, but the present invention is not limited to these examples.

It is to be noted that in the below examples, the volume resistivity was measured with a volume resistivity measuring instrument with four probes (MCP-PD51 made by Mitsubishi Chemical Corporation) and the value when a load of 12 kN was applied was represented. The median diameter $D_{50}$ at a cumulative volume of 50% was measured by a wet method with a particle size distribution measuring instrument using laser diffractometry (MT3300EX II made by NIKKISO Co., Ltd.). Elementary analysis was performed by the absolute calibration method with ICPAES (Agilent 730 made by Agilent Technologies Corporation).

Examples 1 to 5

A multipoint copper crucible having a 5-mm-thickness carbon hearth liber was installed in the interior of a vacuum chamber with exhaust equipment including an oil diffusion pump, a mechanical booster pump, and an oil-sealed rotary vacuum pump. Metallic silicon lumps and additional elements were introduced into the crucible. The pressure of its chamber was decreased so as to reach $2\times10^{-4}$ Pa after 2 hours.

It is to be noted that example 1 used Ge as the additional elements, example 2 Al, example 3 Co, example 4 Ti, and example 5 Co and Ge.

The output of an electron gun of a rectilinear electron beam type installed in the chamber was gradually increased to complete melting. Then, a vapor deposition process was performed under conditions of an output of 10 kW and a power density of 1.2 kW/cm$^2$ for two hours. During the vapor deposition process, the temperature of a stainless steel substrate for use in vapor deposition was adjusted to 600° C. Opening the chamber, a silicon deposition lump was obtained.

The produced silicon deposition lump was pulverized and classified with a roll crusher mill and a jet mill, so that silicon-containing particles were obtained. The obtained silicon-containing particles were subjected to a heat treatment for three hours with a rotary kiln having an alumina furnace tube whose temperature was held at 400° C. under an argon air flow.

Comparative Examples 1 to 4

In comparative examples 1, 2, and 3, silicon for use in solar batteries (REC Silicon Inc.), silicon for use in semiconductors (REC Silicon Inc.), and silicon for use in chemicals (Simcoa Operations Pty Ltd.) were respectively pulverized and classified with a roll crusher mill and a jet mill, so that silicon-containing particles were obtained.

In comparative example 4, silicon-containing particles was obtained in the same manner as example 1 except for using Mn, Co, and Ge as additional elements.

Table 1 summarizes the composition, the median diameter $D_{50}$ at a cumulative volume of 50%, the crystal grain size, the true density, and the volume resistivity upon applying a load of 12 kN of the silicon-containing particles in examples 1 to 5 and comparative examples 1 to 4.

TABLE 1

| | | example 1 | example 2 | example 3 | example 4 | example 5 | comparative example 1 | comparative example 2 | comparative example 3 | comparative example 4 |
|---|---|---|---|---|---|---|---|---|---|---|
| component wt % | Si | 51.9 | 92.9 | 92.7 | 94.7 | 46 | 98.8 | 99.7 | 99.2 | 39 |
| | P | 0.007 | 0.005 | 0.004 | 0.005 | 0.004 | — | — | 0.002 | 0.004 |
| | Al | 0.16 | 5.4 | 0.11 | 0.11 | 0.1 | — | 0.01 | 0.1 | 0.14 |
| | Ca | 0.076 | 0.065 | 0.05 | 0.048 | 0.05 | — | — | 0.03 | 0.06 |
| | Ti | 0.014 | 0.003 | 0.003 | 3.3 | 0.003 | — | — | 0.037 | 0.013 |
| | Cr | 0.017 | 0.005 | 0.005 | 0.077 | 0.0015 | 0.005 | — | 0.009 | 0.012 |
| | Mn | 0.005 | 0.001 | 0.002 | 0.009 | 0.004 | — | — | 0.002 | 15 |
| | Fe | 0.11 | 0.15 | 0.15 | 0.53 | 0.1 | 0.02 | 0.018 | 0.28 | 0.09 |
| | Co | 0.012 | 0.003 | 6 | 0.071 | 12 | — | — | — | 9 |
| | Ni | 0.011 | 0.003 | 0.004 | 0.067 | 0.01 | 0.003 | — | 0.004 | 0.003 |
| | Cu | 0.008 | 0.004 | 0.008 | 0.007 | 0.007 | — | — | 0.003 | 0.004 |
| | Ge | 47 | — | — | — | 41 | — | — | — | 36 |
| | O | 0.7 | 1.5 | 1 | 1.1 | 0.7 | 1.2 | 0.3 | 0.3 | 0.6 |
| $D_{50}$ (µm) | | 6.8 | 8.8 | 8 | 8.3 | 7.3 | 7.8 | 7.9 | 8.4 | 7.8 |
| particle grain size (nm) | | 26 | 106 | 34 | 19 | 285 | 59 | 163 | 338 | 280 |
| $D_{50}$/particle grain size | | 262 | 83 | 235 | 437 | 26 | 37 | 48 | 25 | 28 |
| true density (g/cm$^3$) | | 3.0423 | 2.3719 | 2.5035 | 2.3899 | 3.4012 | 2.3106 | 2.311 | 2.3312 | 3.701 |
| volume resistivity Ωcm | | 2.90E+03 | 72.6 | 7.20E+02 | 3.70E+03 | 1.82E+02 | 2.50E+06 | 3.30E+06 | 10.6 | 1.02E+02 |

As shown in Table 1, it was revealed that the silicon-containing particles in examples 1 to 5 had a crystal grain size of 300 nm or less and a true density of more than 2.320 g/cm$^3$ and less than 3.500 g/cm$^3$.

As shown in Table 1, the comparison of the volume resistivity revealed that the silicon-containing particles for use as a negative-electrode active material of a non-aqueous electrolyte secondary battery in examples 1 to 5, which were doped with other elements, had a lower volume resistivity and more excellent conductivity compared with comparative examples 1 and 2 that prepared the silicon-containing particles from the silicon for use in semiconductors, as a single substance.

<Battery Characteristic Evaluation>

The battery characteristics attributable to the silicon-containing particles in examples 1 to 5 and comparative examples 1 to 4 were evaluated to check their usefulness as the negative-electrode active material.

A mixture was made from 15 mass % of the silicon-containing particles as the negative-electrode active materials in each of examples 1 to 5 and comparative examples 1 to 4, 79.5 mass % of synthetic graphite having a median diameter $D_{50}$ of 10 µm as a conductive agent, and 1.5 mass % of carboxymethyl cellulose (CMC) powder. This mixture was further mixed with acetylene black (17.5% solids) dispersed in water at an amount of 2.5 mass % in terms of solids and styrene-butadiene rubber, SBR (40% solids), dispersed in water at an amount of 1.5 mass % in terms of solids. The resultant mixture was deluded with ion exchanged water to form a slurry.

This slurry was applied to a 12-μm-thickness copper foil with a 150-μm doctor blade, pre-dried, and pressed by a roller press at 60° C. into an electrode form. This electrode form was dried at 160° C. for two hours and punched out into a 2 cm$^2$ of negative electrode molded body.

Four lithium-ion secondary batteries for evaluation were manufactured by using the obtained negative-electrode molded body, a lithium foil as a counter electrode, a non-aqueous electrolyte solution obtained by dissolving a non-aqueous electrolyte of lithium bis(trifluoromethanesulfonyl) imide in a 1/1 (by volume) mixture of ethylene carbonate and diethyl carbonate at a concentration of 1 mol/L, and a separator of a polyethylene microporous film having a thickness of 30 μm.

The manufactured lithium-ion secondary batteries were aged a night at room temperature. Two of the lithium-ion secondary batteries were then disassembled to measure the thickness of the negative electrodes and calculate electrode density on the basis of initial weight in a state where the swelling of electrodes by the electrolyte occurred. It is to be noted that it was calculated without taking into account an increase amount of lithium due to charge and the electrolyte.

With a secondary battery charge/discharge tester (Nagano K.K.), the other two lithium ion secondary batteries were charged with a constant current of 0.15 c until the voltage of the test cell reached 0 V. After the voltage reached 0 V, the charging was continued while the current was decreased so as to keep the voltage of the test cell 0 V. When the current was decreased to less than 0.02 c, the charging was terminated to calculate the charge capacity. It is to be noted that the symbol "c" means a current value with which the theoretical capacity of a negative electrode is charged in 1 hour.

After the charging, the lithium ion secondary batteries for evaluation were disassembled to measure the thickness of the negative electrodes. The electrode density was calculated from the measured thickness in the same manner as above and the charge capacity per volume upon charging was calculated. Table 2 shows the result.

<Cycle Characteristics Evaluation>

Negative-electrode molded bodies were prepared by using the negative-electrode active materials in examples 1 to 5 and comparative examples 1 and 4 to evaluate their cycle characteristics. Positive-electrode molded bodies were made by using a positive-electrode material: a positive-electrode active material of $LiCoO_2$; and a current collector of an aluminum foil single layer sheet (trade name: Pioxcel C-100 made by Pionics Co., Ltd.). Four lithium-ion secondary batteries in coin form were manufactured by using a non-aqueous electrolyte solution obtained by dissolving a non-aqueous electrolyte of lithium hexafluorophosphate in a 1/1 (by volume) mixture of ethylene carbonate and diethyl carbonate at a concentration of 1 mol/L, and a separator of a polyethylene microporous film having a thickness of 30 μm.

The manufactured lithium-ion secondary batteries were left at room temperature two nights. With the secondary battery charge/discharge tester (Nagano K.K.), the lithium ion secondary batteries were charged with a constant current of 1.2 mA (0.25 c on the positive electrode basis) until the voltage of the test cell reached 4.2 V. After the voltage reached 4.2 V, the charging was continued while the current was decreased so as to keep the voltage of the test cell 4.2 V. When the current was decreased to less than 0.3 mA, the charging was terminated. The batteries were then discharged at a constant current of 0.6 mA. The discharging was terminated when the cell voltage reached 3.3 V to calculate the discharge capacity.

This operation was repeated 300 cycles. Table 2 shows the ratio (capacity maintenance rate) of the discharge capacity after 100 cycles or 300 cycles to the initial discharge capacity (i.e. the discharge capacity after 100 cycles or 300 cycles/the initial discharge capacity).

TABLE 2

| | CHARGE CAPACITY (mAh/g) (counter electrode: Li) | VOLUME EXPANSION RATE (%) | CAPACITY MAINTENANCE RATE % | |
|---|---|---|---|---|
| | | | AFTER 100 CYCLES | AFTER 300 CYCLES |
| EXAMPLE 1 | 738 | 132 | 88 | 82 |
| EXAMPLE 2 | 753 | 145 | 85 | 79 |
| EXAMPLE 3 | 653 | 128 | 81 | 77 |
| EXAMPLE 4 | 752 | 165 | 82 | 78 |
| EXAMPLE 5 | 621 | 122 | 86 | 71 |
| COMPARATIVE EXAMPLE 1 | 777 | 180 | 52 | 41 |
| COMPARATIVE EXAMPLE 2 | 765 | 192 | 43 | 37 |
| COMPARATIVE EXAMPLE 3 | 789 | 215 | 42 | 36 |
| COMPARATIVE EXAMPLE 4 | 485 | 124 | 43 | 22 |

Table 2 shows that examples 1 to 5 formed negative electrodes having higher charge capacities than the charge capacity per weight (372 mAh/g) of graphite. Table 2 also shows that the volume expansion rates of examples 1 to 5 were lower than those in comparative examples 1 to 3 and the capacity maintenance rates in the cycles of examples 1 to 5 were better than those of the negative-electrode material in comparative examples 1 to 3 that used silicon as a single substance and the negative-electrode material in comparative example 4 that used the silicon alloy having a true density of more than 3.500 g/cm$^3$.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method for manufacturing a silicon-containing particle for use as a negative-electrode active material of a non-aqueous electrolyte secondary battery, the method comprising:
    depositing a silicon lump or a silicon alloy lump on a substrate by vacuum deposition; and
    pulverizing the silicon lump or the silicon alloy lump to produce the silicon-containing particle,
    wherein:
    the silicon-containing particle has (i) a crystal grain size that is 300 nm or less, the crystal grain size being obtained by a Scherrer method from a full width at half maximum of a diffraction line attributable to Si (111) and near 2θ=28.4° in an x-ray diffraction pattern analysis, and (ii) a true density that is equal to or more than 2.3719 g/cm$^3$ and less than 3.500 g/cm$^3$.

2. The method for manufacturing a silicon-containing particle according to claim 1, wherein the silicon-containing particle has a volume median diameter $D_{50}$ of a particle size ranging from 1 µm to 20 µm.

3. The method for manufacturing a silicon-containing particle according to claim 2, wherein the step of depositing includes depositing the silicon alloy lump by vacuum deposition, and the silicon alloy lump contains one or more elements selected from the group consisting of boron, aluminum, phosphorus, titanium, vanadium, chromium, manganese, iron, cobalt, nickel, copper, zinc, arsenic, germanium, tin, antimony, indium, tantalum, tungsten, and gallium.

4. A method for manufacturing a negative-electrode material for use in a non-aqueous electrolyte secondary battery, the method comprising forming the negative-electrode material from silicon-containing particles manufactured using the method according to claim 3, the silicon-containing particles acting as a negative-electrode active material of the non-aqueous electrolyte secondary battery.

5. The method for manufacturing a negative-electrode material for use in a non-aqueous electrolyte secondary battery according to claim 4, wherein the negative-electrode material is further formed from graphite, the graphite acting as a conductive agent.

6. A method for manufacturing a negative-electrode material for use in a non-aqueous electrolyte secondary battery, the method comprising forming the negative-electrode material from silicon-containing particles manufactured using the method according to claim 2, the silicon-containing particles acting as a negative-electrode active material of the non-aqueous electrolyte secondary battery.

7. The method for manufacturing a negative-electrode material for use in a non-aqueous electrolyte secondary battery according to claim 6, wherein the negative-electrode material is further formed from graphite, the graphite acting as a conductive agent.

8. The method for manufacturing silicon-containing particle according to claim 1, wherein the silicon-containing particle has a quotient of a volume median diameter $D_{50}$ of a particle size divided by the crystal grain size ranging from 1 to 5000.

9. The method for manufacturing a silicon-containing particle according to claim 8, wherein the step of depositing includes depositing the silicon alloy lump by vacuum deposition, and the silicon alloy lump contains one or more elements selected from the group consisting of boron, aluminum, phosphorus, titanium, vanadium, chromium, manganese, iron, cobalt, nickel, copper, zinc, arsenic, germanium, tin, antimony, indium, tantalum, tungsten, and gallium.

10. A method for manufacturing a negative-electrode material for use in a non-aqueous electrolyte secondary battery, the method comprising forming the negative-electrode material from silicon-containing particles manufactured using the method according to claim 9, the silicon-containing particles acting as a negative-electrode active material of the non-aqueous electrolyte secondary battery.

11. The method for manufacturing a negative-electrode material for use in a non-aqueous electrolyte secondary battery according to claim 10, wherein the negative-electrode material is further formed from graphite, the graphite acting as a conductive agent.

12. A method for manufacturing a negative-electrode material for use in a non-aqueous electrolyte secondary battery, the method comprising forming the negative-electrode material from silicon-containing particles manufactured using the method according to claim 8, the silicon-containing particles acting as a negative-electrode active material of the non-aqueous electrolyte secondary battery.

13. The method for manufacturing a negative-electrode material for use in a non-aqueous electrolyte secondary battery according to claim 12, wherein the negative-electrode material is further formed from graphite, the graphite acting as a conductive agent.

14. The method for manufacturing a silicon-containing particle according to claim 1, wherein the step of depositing includes depositing the silicon alloy lump by vacuum deposition, and the silicon alloy lump contains one or more elements selected from the group consisting of boron, aluminum, phosphorus, titanium, vanadium, chromium, manganese, iron, cobalt, nickel, copper, zinc, arsenic, germanium, tin, antimony, indium, tantalum, tungsten, and gallium.

15. A method for manufacturing a negative-electrode material for use in a non-aqueous electrolyte secondary battery, the method comprising forming the negative-electrode material from silicon-containing particles manufactured using the method according to claim 14, the silicon-containing particles acting as a negative-electrode active material of the non-aqueous electrolyte secondary battery.

16. The method for manufacturing a negative-electrode material for use in a non-aqueous electrolyte secondary battery according to claim 15, wherein the negative-electrode material is further formed from graphite, the graphite acting as a conductive agent.

17. A method for manufacturing a negative-electrode material for use in a non-aqueous electrolyte secondary battery, the method comprising forming the negative-electrode material from silicon-containing particles manufactured using the method according to claim 1, the silicon-containing particles acting as a negative-electrode active material of the non-aqueous electrolyte secondary battery.

18. The method for manufacturing a negative-electrode material for use in a non-aqueous electrolyte secondary battery according to claim 17, wherein the negative-electrode material is further formed from graphite, the graphite acting as a conductive agent.

19. A method for manufacturing a non-aqueous electrolyte secondary battery, the method comprising:
forming a negative-electrode molded body from the negative-electrode material manufactured using the method according to claim 17;
providing a positive-electrode molded body;
providing a separator configured to separate the negative-electrode molded body from the positive-electrode molded body; and
providing a non-aqueous electrolyte.

20. The method for manufacturing a non-aqueous electrolyte secondary battery according to claim 19, wherein a material containing lithium ions is used as the non-aqueous electrolyte.

* * * * *